(12) United States Patent
Ding et al.

(10) Patent No.: US 7,062,838 B2
(45) Date of Patent: Jun. 20, 2006

(54) METHOD OF FORMING AN EMBEDDED READ ELEMENT

(75) Inventors: Meng Ding, Mountain View, CA (US); Kuok San Ho, Santa Clara, CA (US); Tsann Lin, Saratoga, CA (US); Huey-Ming Tzeng, San Jose, CA (US)

(73) Assignee: Hitachi Global Storage Technologies Netherland B.V., Amsterdam (NL)

( * ) Notice: Subject to any disclaimer, the term of this patent is extended or adjusted under 35 U.S.C. 154(b) by 145 days.

(21) Appl. No.: 10/666,679

(22) Filed: Sep. 19, 2003

(65) Prior Publication Data

US 2005/0063103 A1    Mar. 24, 2005

(51) Int. Cl.
G11B 5/187      (2006.01)
H01F 7/06       (2006.01)

(52) U.S. Cl. .............. 29/603.12; 29/603.16; 29/603.15; 360/313; 360/324

(58) Field of Classification Search .......... 29/603.07, 29/603.09, 603.12, 603.15, 603.16, 603.18; 360/313, 324, 326
See application file for complete search history.

(56) References Cited

U.S. PATENT DOCUMENTS

| 5,065,483 A | * | 11/1991 | Zammit ............... 29/603.09 X |
| 6,317,289 B1 | | 11/2001 | Sasaki ..................... 360/126 |
| 2002/0013995 A1 | | 2/2002 | Sasaki ................... 29/603.15 |

FOREIGN PATENT DOCUMENTS

JP    5-189727    *    7/1993

* cited by examiner

*Primary Examiner*—A. Dexter Tugbang
(74) *Attorney, Agent, or Firm*—Zilka-Kotab, PC

(57) ABSTRACT

A method of forming an embedded read element is used in the fabrication process of a magnetic head assembly including write and read heads. In this method, three photolithographic patterning steps are applied for defining the designed height of the embedded read element, defining its designed width, and connecting it with conducting layers, respectively. An in-line lapping guide is also formed with a spacing in front of the embedded read element. In this method, two mechanical lapping steps are applied, one monitored by measuring the resistance of a parallel circuit of the embedded read element and the in-line lapping guide, and the other monitored by measuring the GMR response of the embedded read element.

17 Claims, 7 Drawing Sheets

METHOD OF FORMING AN EMBEDDED READ ELEMENT

FIELD OF THE INVENTION

The present invention relates to a method of forming an embedded read element such as an embedded current-perpendicular-to-plane (CPP) giant magnetoresistance (GMR) sensor, a current-in-plane (CIP) GMR sensor, or a tunneling magnetoresistance (TMR) sensor.

BACKGROUND OF THE INVENTION

The heart of a computer is a magnetic disk drive that includes a magnetic disk, a slider where a magnetic head assembly including write and read heads is mounted, a suspension arm, and an actuator arm. When the magnetic disk is stationary, the slider is biased by the suspension arm into contact with the surface of the magnetic disk. When the magnetic disk rotates, the rotating magnetic disk swirls air at an air bearing surface (ABS) of the slider, causing the slider to fly on an air bearing. When the slider flies on the air bearing, the actuator arm swings the suspension arm to place the magnetic head assembly over selected circular tracks on the rotating magnetic disk, where signal fields are written and read by the write and read heads, respectively. The write and read heads are connected to processing circuitry that operates according to a computer program to implement write and read functions.

An exemplary high performance read head employs a read element for sensing the signal fields from the rotating magnetic disk. The most recently explored read element, a giant magnetoresistance (GMR) sensor, comprises a nonmagnetic Ni—Cr—Fe seed layer, ferromagnetic Ni—Fe/Co—Fe sense layers, a nonmagnetic Cu—O spacer layer, a ferromagnetic Co—Fe reference layer, a nonmagnetic Ru antiparallel (AP) exchange-coupling layer, a ferromagnetic Co—Fe keeper layer, and nonmagnetic Cu and Ta cap layers. Crystalline reconstruction occurring in the Ni—Cr—Fe seed and Ni—Fe sense layers causes the two layers to behave as if a monolayer film exhibiting coarse polycrystalline grains with a strong <111> texture, thus leading the GMR sensor to exhibit low sensor resistance and a high GMR coefficient. Intrinsic and extrinsic uniaxial anisotropies of the Co—Fe reference and Co—Fe keeper layers, and their ferromagnetic/ferromagnetic AP exchange coupling occurring across the Ru AP exchange-coupling layer cause the Co—Fe reference and Co—Fe keeper layers to be self-pinned, thus leading the GMR sensor to operate properly. Alternatively, an antiferromagnetic Pt—Mn pinning layer is sandwiched into the Co—Fe keeper and Cu cap layers. Ferromagnetci/antiferromagnetic exchange coupling occurring between the Co—Fe keeper and Pt—Mn pinning layers causes rigid pinning to the Co—Fe keeper layer, thus reinforcing the AP exchange coupling pinning and ensuring the proper sensor operation.

In the prior art, the fabrication process of the magnetic head assembly typically includes building the read head on a wafer, building the write head on the wafer, slicing the wafer into rows, mechanically lapping and overcoating the rows, and slicing the rows into sliders. During building the read head on the wafer, the GMR sensor is formed with three photolithographic patterning steps. FIG. 1 illustrates a top view of a GMR sensor 100 formed according to the prior art. FIGS. 2 and 3 are cross-sectional views of the GMR sensor 100 formed in the prior art on planes perpendicular and parallel, respectively, to its ABS. In the first step, a region 101 is formed with a height of about 3,000 nm, much larger than the designed height of the GMR sensor 100 (60 nm). An insulating $Al_2O_3$ film is deposited outside the region 101. In the second step, two regions 102 are formed with a separation equivalent to the designed width of the GMR sensor 100 (80 nm). Longitudinal bias and first conducting layers are deposited into the two regions 102. In the third step, two regions 103 are formed on top of the two regions 102. Second conducting layers are deposited into the two regions 103.

FIGS. 4 and 5 illustrate cross-sectional views of the GMR sensor formed and a magnetic head assembly fabricated, respectively, in the prior art on a plane perpendicular to its ABS after mechanical lapping and overcoating. During the mechanical lapping, the height of the GMR sensor 100 is reduced from about 3,000 nm to a designed height of as small as 60 nm. The mechanical lapping is monitored by measuring the resistance of an electrical lapping guide (not shown) with the same structure and geometry as the GMR sensor 100, located more than 100 μm away from the GMR sensor 100, and is stopped as its resistance substantially increases from about 16 to about 50 Ω. Hence, in the prior-art, the designed width of the GMR sensor is defined by the photolithographic patterning, while its designed height is defined by the mechanical lapping.

There are several disadvantages in the GMR sensor formed in the prior art. First, electrostatic discharge (ESD) damages may occur during the mechanical lapping due to an unwanted substantial increase in the resistance of the GMR sensor 100. The GMR sensor 100 may thus be not viable at all. Second, the sensor height may substantially vary due to difficulties in remotely controlling the resistance of the GMR sensor 100 within a desired narrow resistance range. A manufacturing control for a high yield may thus be very challenging. Third, the magnetic moments of sense, reference and keeper layers at the ABS may substantially decrease by uncertain amounts, while the pinning layer may corrode, due to the exposure of the ABS to the chemical solution and air. The designed magnetic moments and desired exchange-coupling may not be attained at the ABS, thus substantially reducing the signal sensitivity of the GMR sensor 100. Fourth, all the various layers of the GMR sensor 100 may be recessed differently and an unwanted stepped ABS is formed, due to their different mechanical lapping rates. The protection overcoat 200 may thus not adhere well on this stepped ABS, thus causing concerns on the contact of the GMR sensor 100 with the rotating magnetic disk during sensor operation. Because of these problems, the GMR sensors 100 formed in the prior art may not be suitable for magnetic recording at ultrahigh densities.

What is needed is a method that reduces the risk of ESD damages, controls the sensor resistance, minimizes the losses in the magnetic moments, and eliminates the corrosion.

What is also needed is a method that precisely controls the height of the GMR sensor 100.

What is further needed is a method that eliminates the protection overcoat, thereby minimizing a spacing between the GMR sensor 100 and the rotating magnetic disk.

SUMMARY OF THE INVENTION

A method of forming an embedded read element is used in the fabrication process of a magnetic head assembly including write and read heads. The embedded read element is made of an embedded giant magnetoresistance (GMR) sensor used in either a current-in-plane (CIP) or a currentperpendicular-to-plane (CPP) mode. Alternatively, the embedded read element is made of an embedded tunneling magnetoresistances (TMR) sensor used in a CPP mode.

In this method, three photolithographic patterning steps are applied for defining the designed height of the embedded read element, defining its designed width, and connecting it with conducting layers, respectively. An in-line lapping guide is also formed with a spacing in front of the embedded read element. In this method, two mechanical lapping steps are applied, one monitored by measuring the resistance of a parallel circuit of the embedded read element and the in-line lapping guide, and the other monitored by measuring the GMR response of the embedded read element.

There are several advantages provided by this method. First, the ESD damage can be prevented during the mechanical lapping, since the in-line lapping guide acts as a shunt in the parallel circuit of the embedded read element and the in-line lapping guide, and when the in-line lapping guide is completely removed, the trench act as a buffer to maintain the resistance of the embedded read element constant. The viability of the embedded read element can thus be ensured. Second, the sensor height, defined by the photolithographical patterning as opposed to the mechanical lapping, can be maintained constant during the mechanical lapping. A precise manufacturing control can thus be ensured. Third, the magnetic moments of the sense, reference and keeper layers can be maintained, while the pinning layer will not corrode, since the embedded read element is not exposed to the chemical solution and air at all. A higher signal sensitivity can thus be attained. Fourth, the ABS of the embedded read element remains smooth and doesn't require any protection overcoat. The concern on contacts with the rotating magnetic disk can thus be alleviated. Because of these advantages, the embedded read element formed in this method is suitable for magnetic recording at ultrahigh densities.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out this invention. This description is made for the purpose of illustrating the general principles of this invention and is not meant to limit the inventive concepts claimed herein.

Figure 1:
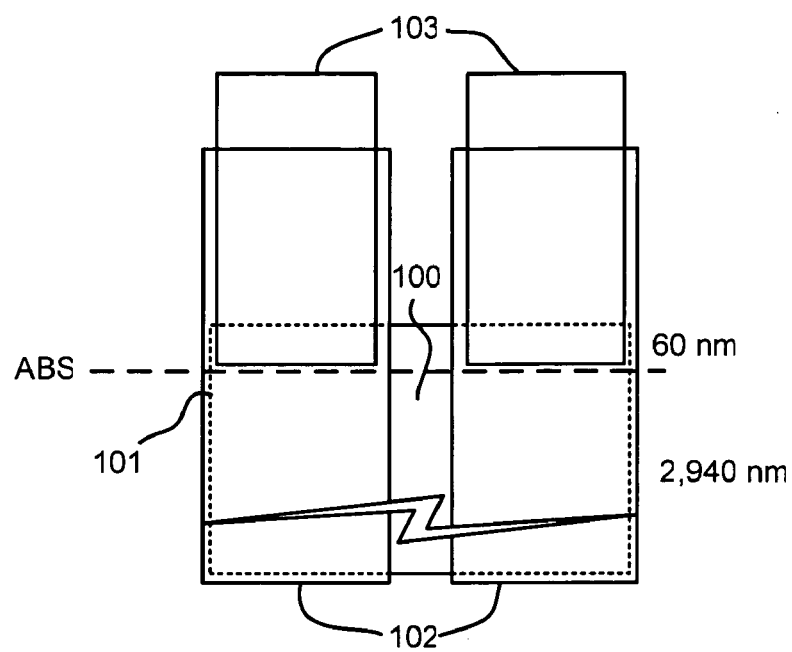
FIG. 1 is a top view of a GMR sensor formed in the prior art.
Figure 2:
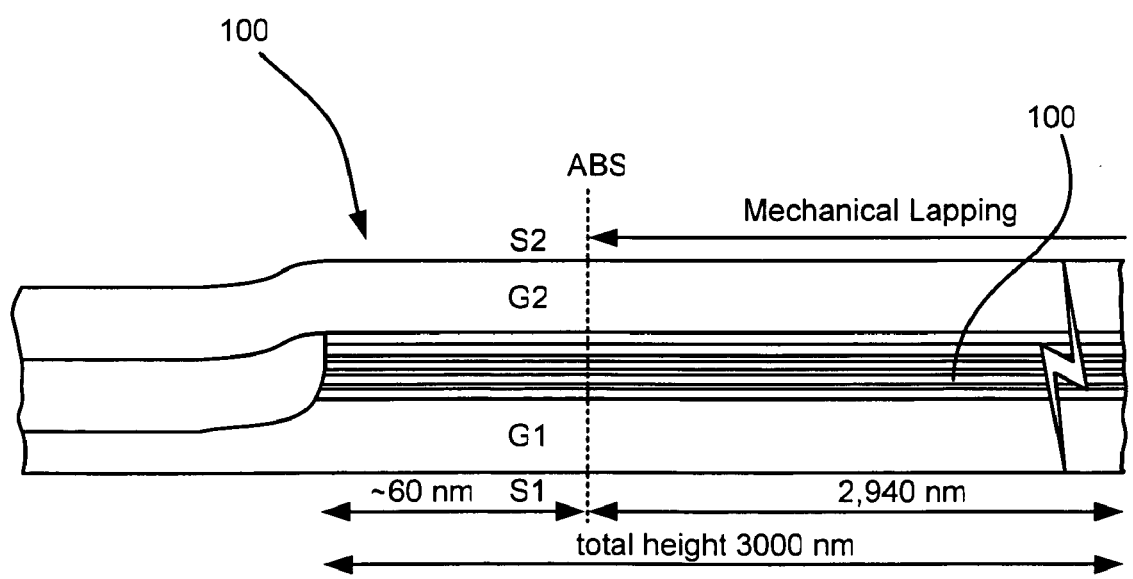
FIG. 2 is a cross-sectional view of a GMR sensor formed in the prior art on a plane perpendicular to its ABS.
Figure 3:
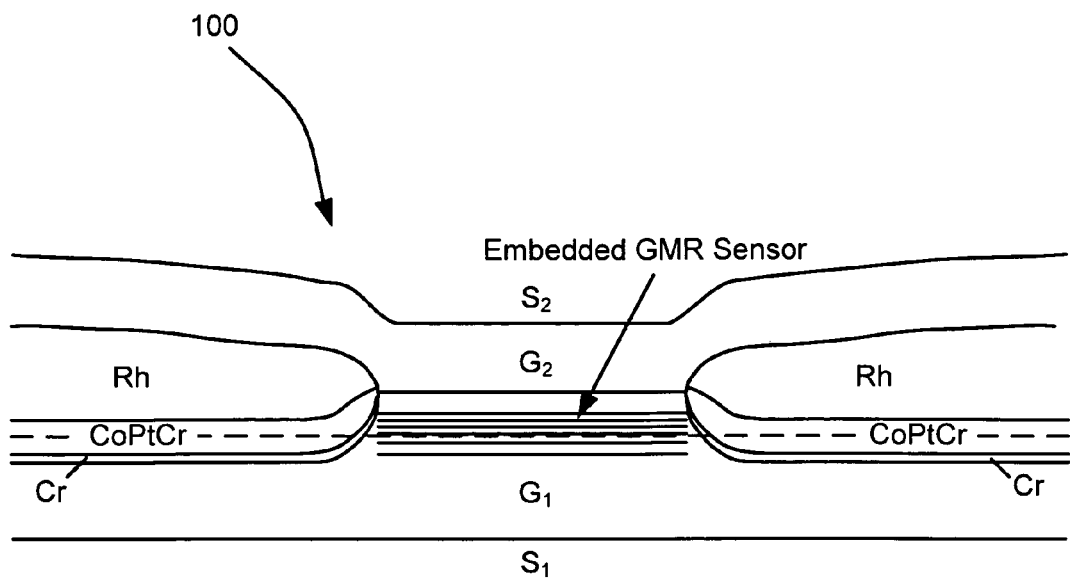
FIG. 3 is a cross-sectional view of a GMR sensor formed in the prior art on a plane parallel to its ABS.
Figure 4:
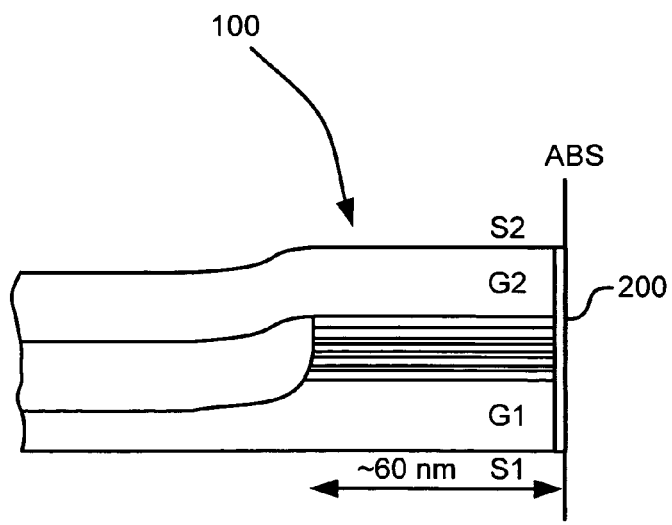
FIG. 4 is a cross-sectional view of a GMR sensor formed in the prior art after mechanical lapping and overcoating, on a plane perpendicular to its ABS.
Figure 5:
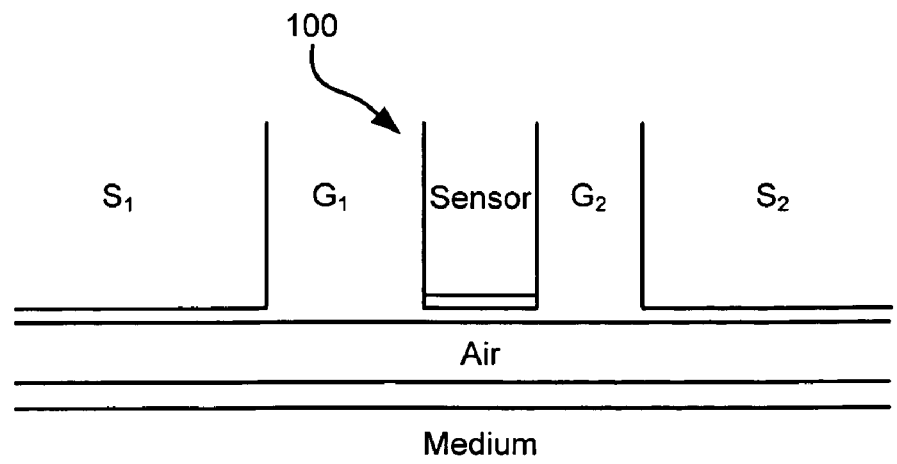
FIG. 5 is a cross-sectional view of a magnetic head assembly fabricated in the prior art on a plane perpendicular to its ABS.
Figure 6:
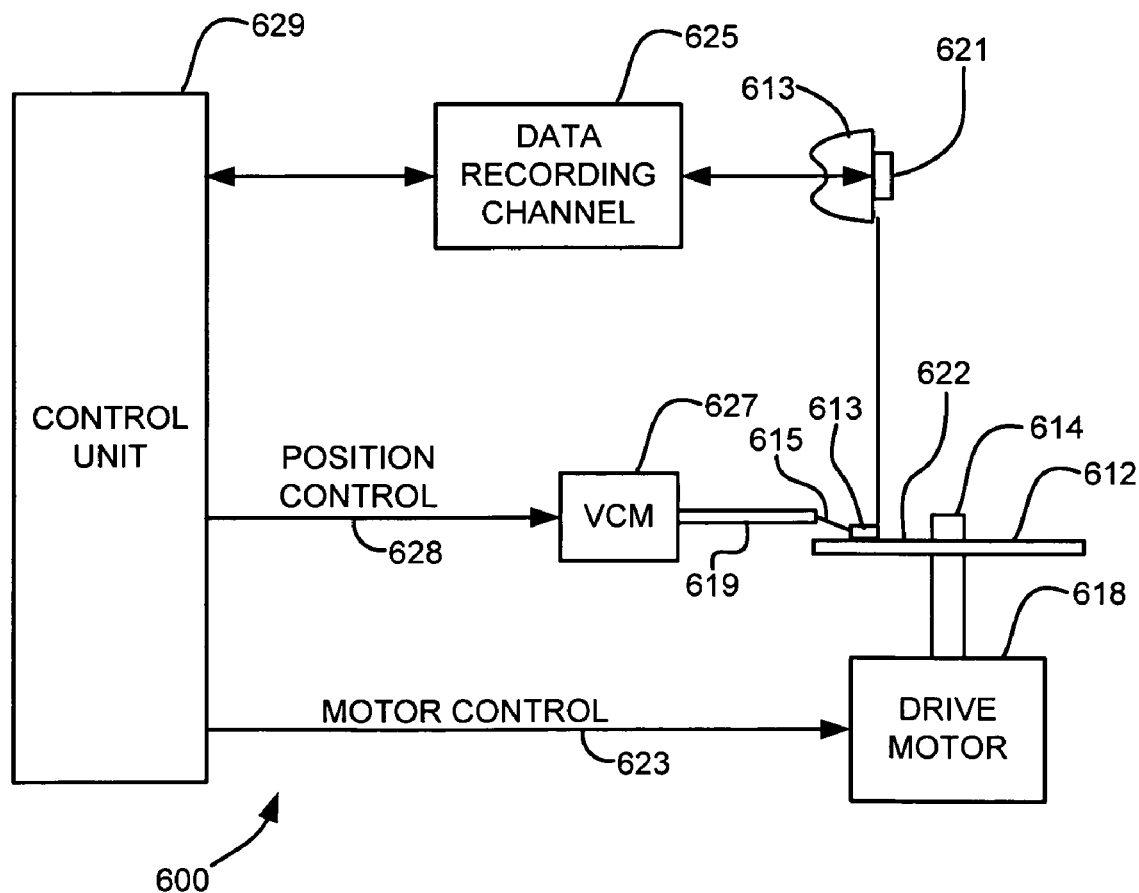
FIG. 6 is a simplified drawing of a magnetic recording disk drive system.

Referring now to FIG. 6, there is shown a disk drive 600 embodying this invention. As shown in FIG. 6, at least one rotatable magnetic disk 612 is supported on a spindle 614 and rotated by a disk drive motor 618. The magnetic recording on each disk is in the form of an annular pattern of concentric data tracks (not shown) on the magnetic disk 612.

At least one slider 613 is positioned near the magnetic disk 612, each slider 613 supporting one or more magnetic head assemblies 621. As the magnetic disk rotates, slider 613 is moved radially in and out over the disk surface 622 so that the magnetic head assembly 621 may access different tracks of the magnetic disk where desired data are written. Each slider 613 is attached to an actuator arm 619 by way of a suspension 615. The suspension 615 provides a slight spring force which biases slider 613 against the disk surface 622. Each actuator arm 619 is attached to an actuator means 627. The actuator means 627 as shown in FIG. 6 may be a voice coil motor (VCM). The VCM comprises a coil movable within a fixed magnetic field, the direction and speed of the coil movements being controlled by the motor current signals supplied by controller 629.

During operation of the disk storage system, the rotation of the magnetic disk 612 generates an air bearing between the slider 613 and the disk surface 622 which exerts an upward force or lift on the slider. The air bearing thus counter-balances the slight spring force of suspension 615 and supports slider 613 off and slightly above the disk surface by a small, substantially constant spacing during normal operation.

The various components of the disk storage system are controlled in operation by control signals generated by control unit 629, such as access control signals and internal clock signals. Typically, the control unit 629 comprises logic control circuits, storage means and a microprocessor. The control unit 629 generates control signals to control various system operations such as drive motor control signals on line 623 and head position and seek control signals on line 628. The control signals on line 628 provide the desired current profiles to optimally move and position slider 613 to the desired data track on disk 612. Write and read signals are communicated to and from write and read heads 621 by way of recording channel 625.

The above description of a typical magnetic disk storage system, and the accompanying illustration of FIG. 6 are for representation purposes only. It should be apparent that disk storage systems may contain a large number of disks and actuators, and each actuator may support a number of sliders.

Figure 7:
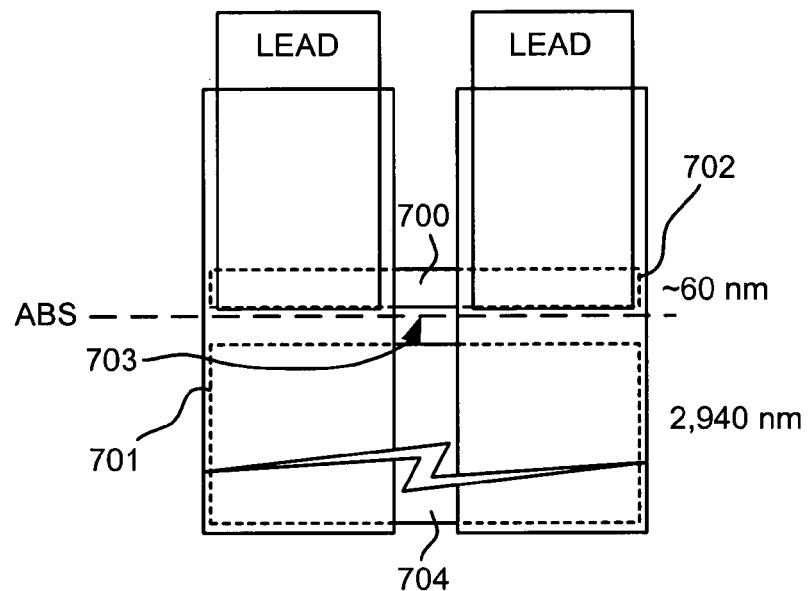
FIG. 7 is a top view of an embedded GMR sensor formed in this invention.
Figure 8:
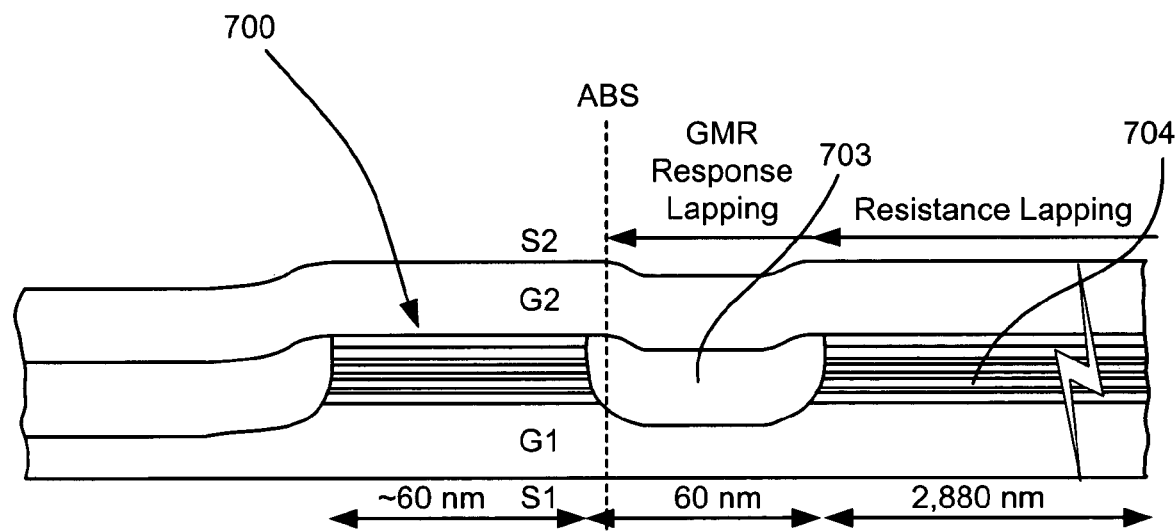
FIG. 8 is a cross-sectional view of an embedded GMR sensor formed in this invention on a plane perpendicular to its ABS.
Figure 9:
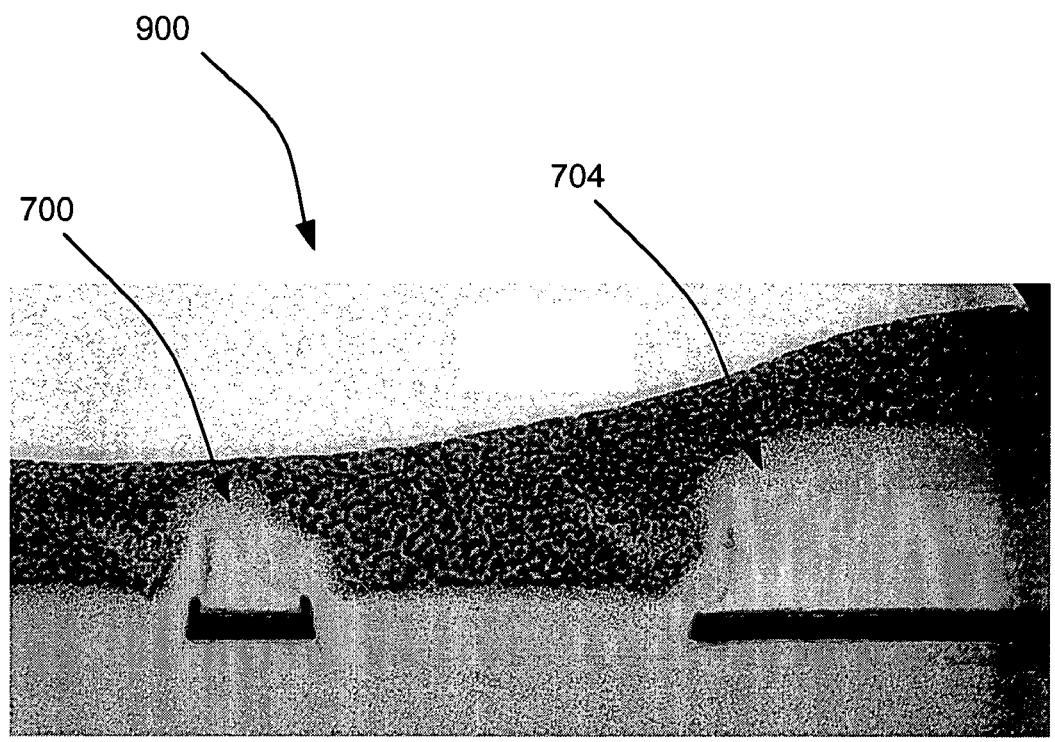
FIG. 9 is a cross-sectional transmission electron micrograph of an embedded GMR sensor formed in this invention on a plane perpendicular to its ABS.

This invention provides a method of forming an embedded read element. The embedded read element is made of an embedded GMR sensor used in either a CIP or a CPP mode. Alternatively, the embedded read element is made of an embedded TMR sensor used in a CPP mode. For simplicity, the following description shall refer to a method of forming an embedded GMR sensor used in a CIP mode, it being understood that the method presented herein are equally applicable to other types of read elements and that the materials and dimensions are provided by way of non-limiting example only. FIG. 7 illustrates a top view of the embedded GMR sensor 700 formed according to the method of this invention. FIG. 8 is a cross-sectional view of the embedded GMR sensor 700 formed on the plane perpendicular to its ABS. FIG. 9 is a cross-sectional transmission electron micrograph 900 of the embedded GMR sensor 700 formed on the plane perpendicular to its ABS. In the fabrication process of a magnetic head assembly including write and read heads, presented by way of example, a 1 μm thick Ni—Fe bottom shield layer is deposited and patterned on a wafer. Subsequently, a 20 nm thick $Al_2O_3$ bottom gap layer, a GMR sensor comprising Ni—Cr—Fe(3)/Ni—Fe(1)/Co—Fe(1.8)/Cu—O(1.8)/Co—Fe(1.7)/Ru(0.8)/Co—Fe(1.7)/Cu(0.6)/Ta(6) films (thickness in nm), and a 20 nm thick carbon film are sequentially deposited on the wafer.

During building the read head on the wafer in this fabrication process, three photolithographic patterning steps are conducted. In the first step, two regions 701, 702 separated by a trench 703 with a spacing of about 80 nm are formed, one with a designed height of 60 nm and the other with a height of about 2,860 nm. A monolayer photoresist is applied and patterned in a photolithographic tool to mask the two regions 701, 702. Ion milling is applied to completely remove the GMR sensor and partially remove the $Al_2O_3$ bottom gap layer in exposed regions. A 20 nm thick $Al_2O_3$ film is deposited into exposed regions. After lifting off the monolayer photoresist, chemical mechanical polishing (CMP) is used to remove unwanted fencings, and reactive ion etching (RIE) is then used to completely remove the carbon film. In the second step, a GMR sensor with a designed width of 80 nm and an in-line lapping guide 704 with the same width are formed. A 20 nm thick carbon film is deposited on the wafer, and another monolayer photoresist is applied and patterned in the photolithographic tool to mask the GMR sensor and the in-line lapping guide. Ion milling is applied to completely remove the GMR sensor and partially remove the $Al_2O_3$ bottom gap layer in exposed side regions. Longitudinal bias layers comprising Cr(3)/Co—Pt—Cr(10) films and first conducting layers comprising Rh(30)/Ta(3) films are then deposited into the side regions. After lifting off the monolayer photoresist, the CMP is used to remove unwanted fencings, and the RIE is then used to completely remove the carbon film. In the third step, the GMR sensor and the in-line lapping guide are connected to two read-head pads. Bilayer photoresists are formed and patterned in the photolithographic tool to mask the GMR sensor, the in-line lapping guide and their neighboring regions. Second conducting layers comprising Ta(3)/Cu(60)/Ta(6) films are deposited into unmasked regions. After lifting off the bilayer photoresists, a 20 nm thick $Al_2O_3$ top gap layer is deposited over the entire wafer. The fabrication process of a write head, as known to those skilled in the art, then starts.

After completing the fabrication process of the magnetic head assembly, the wafer is sliced into rows, and each row is sliced into sliders. Two mechanical lapping steps are applied to each slider.

Figure 10:
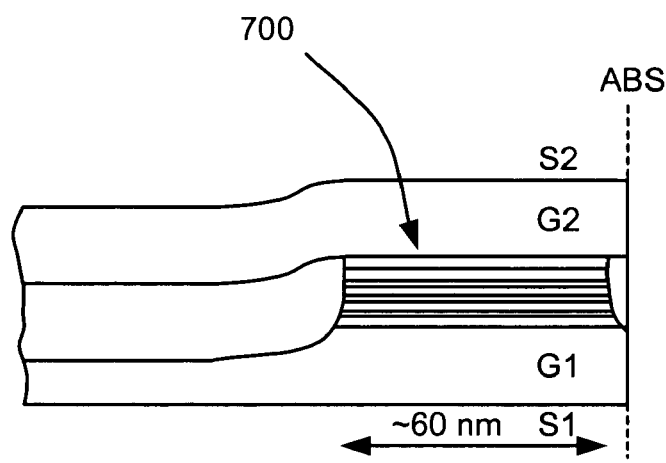
FIG. 10 is a cross-sectional view of an embedded GMR sensor after two mechanical lapping steps.
Figure 11:
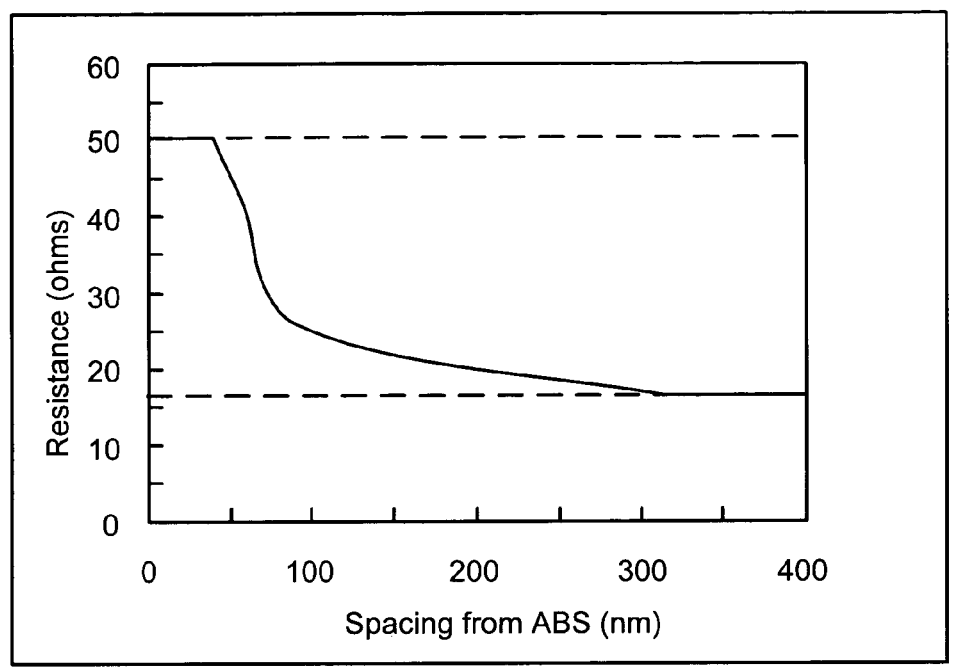
FIG. 11 is a chart depicting exemplary resistance of the parallel circuit of the embedded GMR sensor and the in-line lapping guide as a function of spacing from the ABS during the first mechanical lapping step.

FIG. 10 is a cross-sectional view of the embedded GMR sensor 700 after the two mechanical lapping steps. In the first step, a sense current of 4 mA is applied to the parallel circuit of the GMR sensor 700 and the in-line lapping guide 704, and its resistance is measured. As shown in FIG. 11, the resistance exhibits a constant until the in-line lapping guide 704 is exposed to the chemical solution, increases substantially as the in-line lapping guide 704 is partially removed, and eventually reaches another constant as the in-line lapping guide 704 is completely removed.

Figure 12:
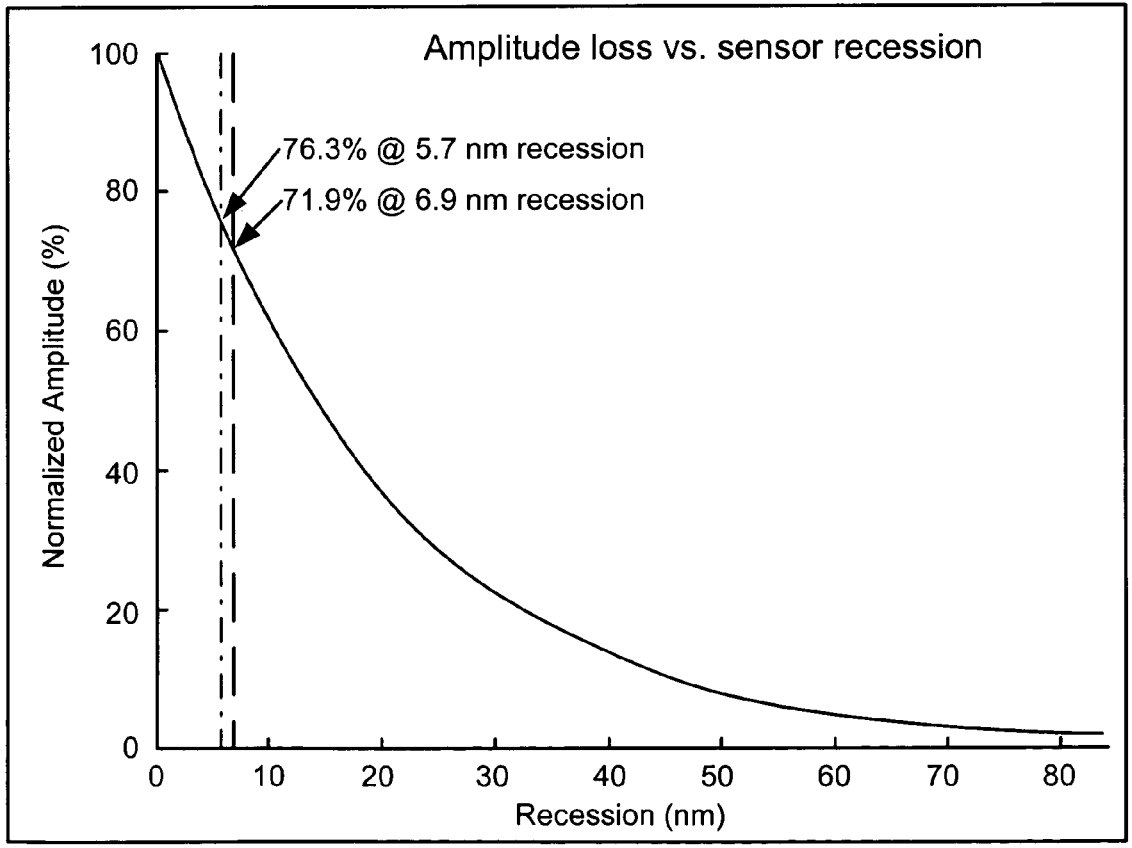
FIG. 12 is a chart depicting exemplary GMR responses of the embedded GMR sensor as a function of spacing from the ABS during the second mechanical lapping step.

In the second step, the sense current of 4 mA and a magnetic field of 100 Oe parallel to the sensor height are applied, and a change in the resistance of the GMR sensor (i.e., a GMR response) is measured. As shown in FIG. 12, this GMR response can be very well characterized by modeling, in which the GMR sensor is assumed to operate with a loss of the trench spacing. The mechanical lapping is stopped as the GMR response increases to about 80% of a calculated GMR response without the spacing loss.

Figure 13:
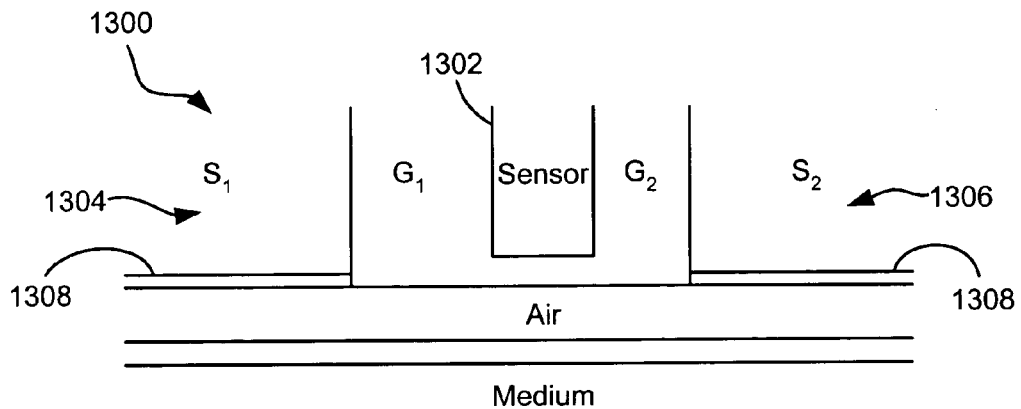
FIG. 13 is a cross-sectional view of a magnetic head assembly fabricated in this invention on a plane perpendicular to its ABS.
Figure 14:
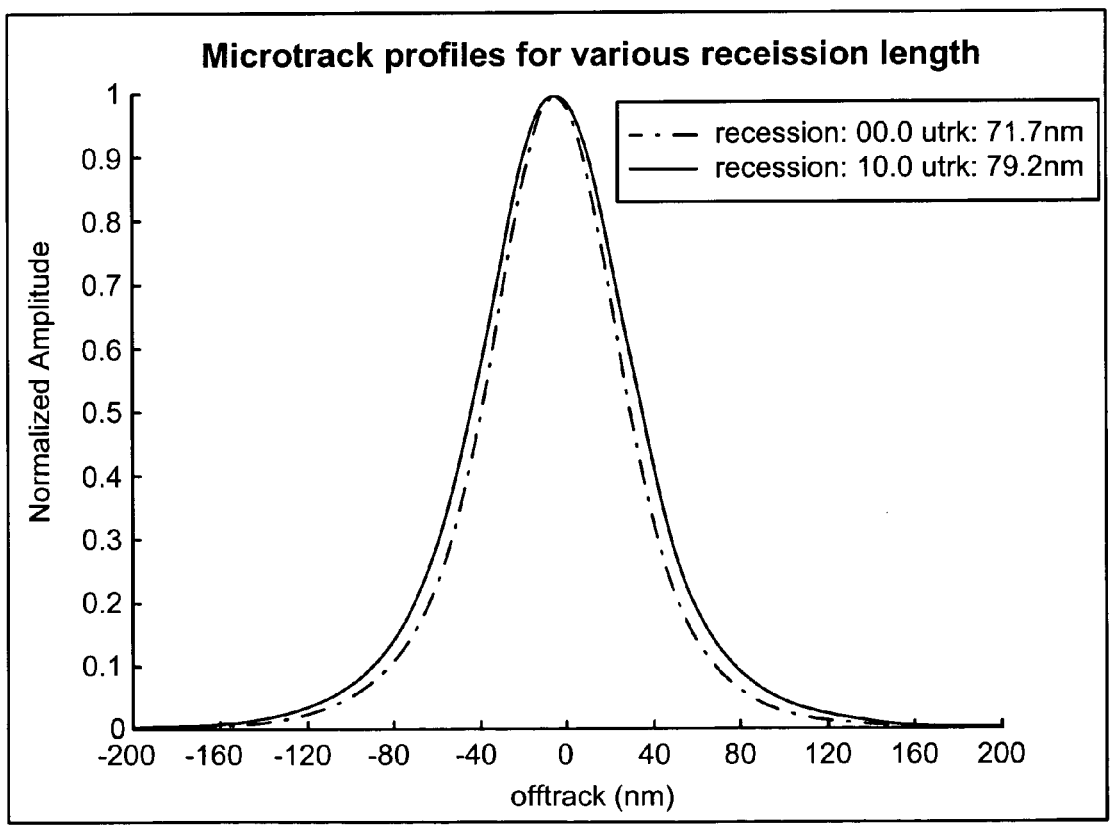
FIG. 14 illustrates modeled microtrack profiles of GMR sensors with recessions of 0 and 10 nm.

FIG. 13 illustrates the cross-sectional view of a magnetic head assembly 1300 fabricated in this invention. After forming the embedded GMR sensor 1302, either natural or plasma oxidation at either a room or high temperature ($\geq 240°$ C.) is applied to the magnetic head assembly 1300. While the embedded GMR sensor 1302 remains intact, two poles 1304, 1306 of the write head are protected with oxides 1308. Since the embedded GMR sensor is recessed by the oxide overcoat from the air bearing, it is crucial for the feasibility of this invention to ensure no substantial effects of this recession on the read resolution. As shown in FIG. 14, modeling indicates that as the recession increases from 0 to 10 nm, the effective read width, determined from the half width of a microtrack profile, only slightly increases from 71.7 to 79.2 nm, indicating minimal effects of this recession on the read resolution.

Alternatively, the structure of the read element presented here can be reversed. For example, the embedded GMR sensor can comprise a nonmagnetic Ni—Cr—Fe seed layer, a ferromagnetic Co—Fe keeper layer, a nonmagnetic Ru AP exchange-coupling layer, a ferromagnetic Co—Fe reference layer, a nonmagnetic Cu—O spacer layer, ferromagnetic Co—Fe/Ni—Fe sense layers, and nonmagnetic Cu and Ta cap layers. Alternatively, an antiferromagnetic Pt—Mn pinning layer can be sandwiched into the Ni—Cr—Fe seed and Co—Fe keeper layers. More alternatively, another Ni—Fe seed layer can be sandwiched into the Ni—Cr—Fe seed and Pt—Mn pinning layers.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of forming an embedded read element, comprising:
performing a photolithographic patterning step for defining a designed height of an embedded read element on a wafer, wherein the definition of the height of the embedded read element also results in formation of an in-line lapping guide with a spacing formed between the embedded read element and the in-line lapping guide;

performing a further photolithographic patterning step for defining a designed width of the embedded read element;

performing a further photolithographic patterning step for connecting the embedded read element and the in-line lapping guide with conducting layers;

performing a first mechanical lapping step on the wafer, wherein the first mechanical lapping step is monitored by measuring the resistance of a parallel circuit of the embedded read element and the in-line lapping guide; and performing a second mechanical lapping step on the wafer, wherein the second mechanical lapping step is monitored by measuring the GMR response of the embedded read element.

2. A method as recited in claim 1, wherein the read element is an embedded giant magnetoresistance (GMR) sensor used in a current-in-plane (CIP) mode.

3. A method as recited in claim 2, wherein the embedded giant magnetoresistance (GMR) sensor comprises:
   a nonmagnetic seed layer;
   ferromagnetic sense layers;
   a nonmagnetic spacer layer;
   a ferromagnetic reference layer;
   a nonmagnetic antiparallel (AP) exchange-coupling layer;
   a ferromagnetic keeper layer; and
   a nonmagnetic cap layer.

4. A method as recited in claim 3, wherein the embedded giant magnetoresistance (GMR) sensor further comprises an antiferromagnetic pinning layer sandwiched into the keeper and cap layers.

5. A method as recited in claim 3, wherein the embedded giant magnetoresistance (GMR) sensor comprises:
   a nonmagnetic Ni—Cr—Fe seed layer;
   ferromagnetic Ni—Fe/Co—Fe sense layers;
   a nonmagnetic Cu—O spacer layer;
   a ferromagnetic Co—Fe reference layer;
   a nonmagnetic Ru antiparallel (AP) exchange-coupling layer;
   a ferromagnetic Co—Fe keeper layer; and
   nonmagnetic Cu and Ta cap layers.

6. A method as recited in claim 1, wherein the read element is an embedded giant magnetoresistance (GMR) sensor used in a current-perpendicular-to-plane (CPP) mode.

7. A method as recited in claim 6, wherein the embedded giant magnetoresistance (GMR) sensor comprises:
   a nonmagnetic seed layer;
   ferromagnetic sense layers;
   a nonmagnetic spacer layer;
   a ferromagnetic reference layer;
   a nonmagnetic antiparallel (AP) exchange-coupling layer;
   a ferromagnetic keeper layer; and
   a nonmagnetic cap layer.

8. A method as recited in claim 7, wherein the embedded GMR sensor further comprises an antiferromagnetic pinning layer sandwiched into the keeper and cap layers.

9. A method as recited in claim 6, wherein the embedded GMR sensor comprises:
   a nonmagnetic seed layer;
   ferromagnetic sense layers;
   a nonmagnetic spacer layer;
   a ferromagnetic reference layer;
   a nonmagnetic antiparallel (AP) exchange-coupling layer;
   a ferromagnetic keeper layer; and
   a nonmagnetic cap layer.

10. A method as recited in claim 9, wherein the embedded GMR sensor further comprises an antiferromagnetic pinning layer sandwiched into the keeper and cap layers.

11. A method as recited in claim 1, wherein the read element is an embedded tunneling magnetoresistance (TMR) sensor used in a current-perpendicular-to-plane (CPP) mode.

12. A method as recited in claim 11, wherein the embedded TMR sensor comprises:
   a nonmagnetic seed layer;
   ferromagnetic sense layers;
   a nonmagnetic barrier layer;
   a ferromagnetic reference layer;
   a nonmagnetic antiparallel (AP) exchange-coupling layer;
   a ferromagnetic keeper layer; and
   a nonmagnetic cap layer.

13. A method as recited in claim 12, wherein the embedded TMR sensor further comprises an antiferromagnetic pinning layer sandwiched into the keeper and cap layers.

14. A method of forming an embedded read element, comprising:
   performing a photolithographic patterning step for defining a designed height of an embedded read element on a wafer, wherein the definition of the height of the embedded read element also results in formation of an in-line lapping guide with a spacing formed between the embedded read element and the in-line lapping guide;
   performing a further photolithographic patterning step for defining a designed width of the embedded read element;
   performing a first mechanical lapping step on the wafer; and
   performing a second mechanical lapping step on the wafer.

15. A method as recited in claim 14, further comprising performing a further photolithographic patterning step for connecting the embedded read element and the in-line lapping guide with conducting layers.

16. A method as recited in claim 14, wherein the first mechanical lapping step is monitored by measuring the resistance of a parallel circuit of the embedded read element and the in-line lapping guide.

17. A method as recited in claim 14, wherein the second mechanical lapping step is monitored by measuring the GMR response of the embedded read element.

* * * * *